(12) United States Patent
Leong et al.

(10) Patent No.: US 8,011,253 B2
(45) Date of Patent: Sep. 6, 2011

(54) STRESS-WAVE SENSOR MODULE, STRESS-WAVE SENSOR, AND METHOD FOR DETECTING A VEHICLE COLLISION EVENT UTILIZING THE STRESS-WAVE SENSOR

(75) Inventors: Daniel Woon Leong, Singapore (SG); Chee Keng Yeo, Singapore (SG); Yew Kwang Low, Singapore (SG); Kok Wee Yeo, Singapore (SG)

(73) Assignee: Delphi Technologies, Inc., Troy, MI (US)

( * ) Notice: Subject to any disclaimer, the term of this patent is extended or adjusted under 35 U.S.C. 154(b) by 200 days.

(21) Appl. No.: 12/484,547

(22) Filed: Jun. 15, 2009

(65) Prior Publication Data

US 2010/0313663 A1    Dec. 16, 2010

(51) Int. Cl.
  *G01B 7/16*    (2006.01)
(52) U.S. Cl. ............... 73/767; 73/12.01; 73/760
(58) Field of Classification Search ...... 73/12.01–12.14, 73/760–860
See application file for complete search history.

(56) References Cited

U.S. PATENT DOCUMENTS

| | | | | |
|---|---|---|---|---|
| 3,577,779 | A * | 5/1971 | Laimins | 73/862.633 |
| 3,825,343 | A * | 7/1974 | Moore | 356/636 |
| 4,574,640 | A * | 3/1986 | Krechmery | 73/721 |
| 5,086,651 | A * | 2/1992 | Westermo et al. | 73/763 |
| 5,392,024 | A * | 2/1995 | Kiuchi et al. | 340/436 |
| 6,715,337 | B2 | 4/2004 | Huang et al. | |
| 7,231,803 | B2 | 6/2007 | Stuetzler | |
| 7,252,307 | B2 * | 8/2007 | Kanbe et al. | 280/801.1 |
| 7,398,698 | B2 * | 7/2008 | Griess et al. | 73/801 |
| 2002/0023499 | A1 * | 2/2002 | Boehler et al. | 73/715 |
| 2002/0063630 | A1 * | 5/2002 | Curtis et al. | 340/667 |

* cited by examiner

*Primary Examiner* — Max Noori
(74) *Attorney, Agent, or Firm* — Thomas N. Twomey (57) ABSTRACT

A stress-wave sensor module, a stress-wave sensor, and a method for detecting a vehicle collision event utilizing the stress-wave sensor are provided. The stress-wave sensor has first and second support members and a diaphragm member coupled between the first and second support members. The stress-wave sensor further has first and second strain gauge sensors coupled to both the first support member and the diaphragm member. The first and second strain gauge sensors generate first and second signals, respectively, in response to the first and second strain gauge sensors detecting deflection of the diaphragm member due to stress waves propagating through the diaphragm member.

9 Claims, 10 Drawing Sheets

STRESS-WAVE SENSOR MODULE, STRESS-WAVE SENSOR, AND METHOD FOR DETECTING A VEHICLE COLLISION EVENT UTILIZING THE STRESS-WAVE SENSOR

BACKGROUND

Acceleration based sensors have been utilized to detect a vehicle collision with an object. The inventors herein have recognized that a sensor with an even faster response time would be desirable to detect vehicle collisions.

Accordingly, the inventors herein have recognized a need for an improved sensor for detecting stress waves induced by a vehicle collision for detecting the vehicle collision.

SUMMARY OF THE INVENTION

A stress-wave sensor in accordance with an exemplary embodiment is provided. The stress-wave sensor has first and second support members and a diaphragm member coupled between the first and second support members. The stress-wave sensor further has first and second strain gauge sensors coupled to both the first support member and the diaphragm member. The first and second strain gauge sensors generate first and second signals, respectively, in response to the first and second strain gauge sensors detecting deflection of the diaphragm member due to stress waves propagating through the diaphragm member.

A stress-wave sensor module in accordance with another exemplary embodiment is provided. The stress-wave sensor module has a housing having a cavity therein. The stress-wave sensor module further includes a stress-wave sensor disposed in the cavity. The stress-wave sensor has first and second support members, a diaphragm member, and first and second strain gauge sensors. The diaphragm member is coupled between the first and second support members. The first and second strain gauge sensors are coupled to both the first support member and the diaphragm member. The first and second strain gauge sensors generate first and second signals, respectively, in response to the first and second strain gauge sensors detecting deflection of the diaphragm member due to stress waves propagating through the diaphragm member.

A method for detecting a vehicle collision event utilizing a stress-wave sensor in accordance with another exemplary embodiment is provided. The stress-wave sensor has first and second support members, a diaphragm member, and first and second strain gauge sensors. The diaphragm member is coupled between the first and second support members. The first and second strain gauge sensors are coupled to both the first support member and the diaphragm member. The method includes generating first and second signals utilizing the first and second strain gauge sensors, respectively, in response to the first and second strain gauge sensors detecting deflection of the diaphragm member due to stress waves propagating through the diaphragm member. The method further includes receiving the first and second signals at a microprocessor. The method further includes determining whether at least one of the first and second signals has an amplitude greater than a threshold amplitude level, utilizing the microprocessor. The method further includes generating a third signal indicating the vehicle collision event has occurred if at least one of the first and second signals has an amplitude greater than the threshold amplitude level, utilizing the microprocessor.

DETAILED DESCRIPTION OF EXEMPLARY EMBODIMENTS

Figure 1:
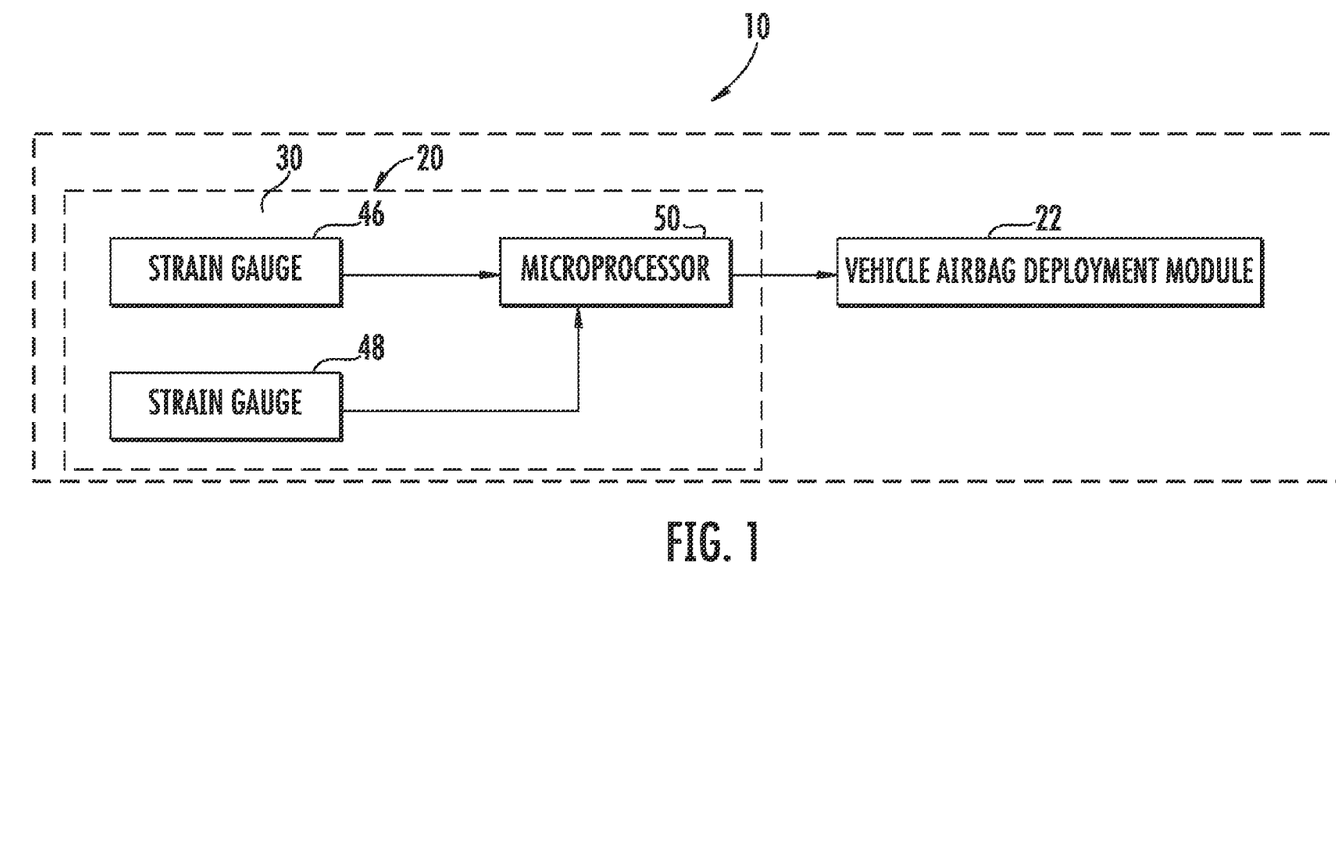
FIG. 1 is a block diagram of a vehicle having a stress-wave sensor module and a vehicle airbag deployment module, in accordance with an exemplary embodiment.

Referring to FIG. 1, a block diagram of a vehicle 10 having a stress-wave sensor module 20 and a vehicle airbag deployment module 22 are illustrated. An advantage of the stress-wave sensor module 20 is that the module 20 can detect stress waves in two axes generated by a vehicle collision event and immediately generate a signal to induce the vehicle airbag deployment module 22 to inflate a vehicle airbag. In one exemplary embodiment, the stress-wave sensor module 20 has a response time of 3-4 milliseconds.

Figure 2:
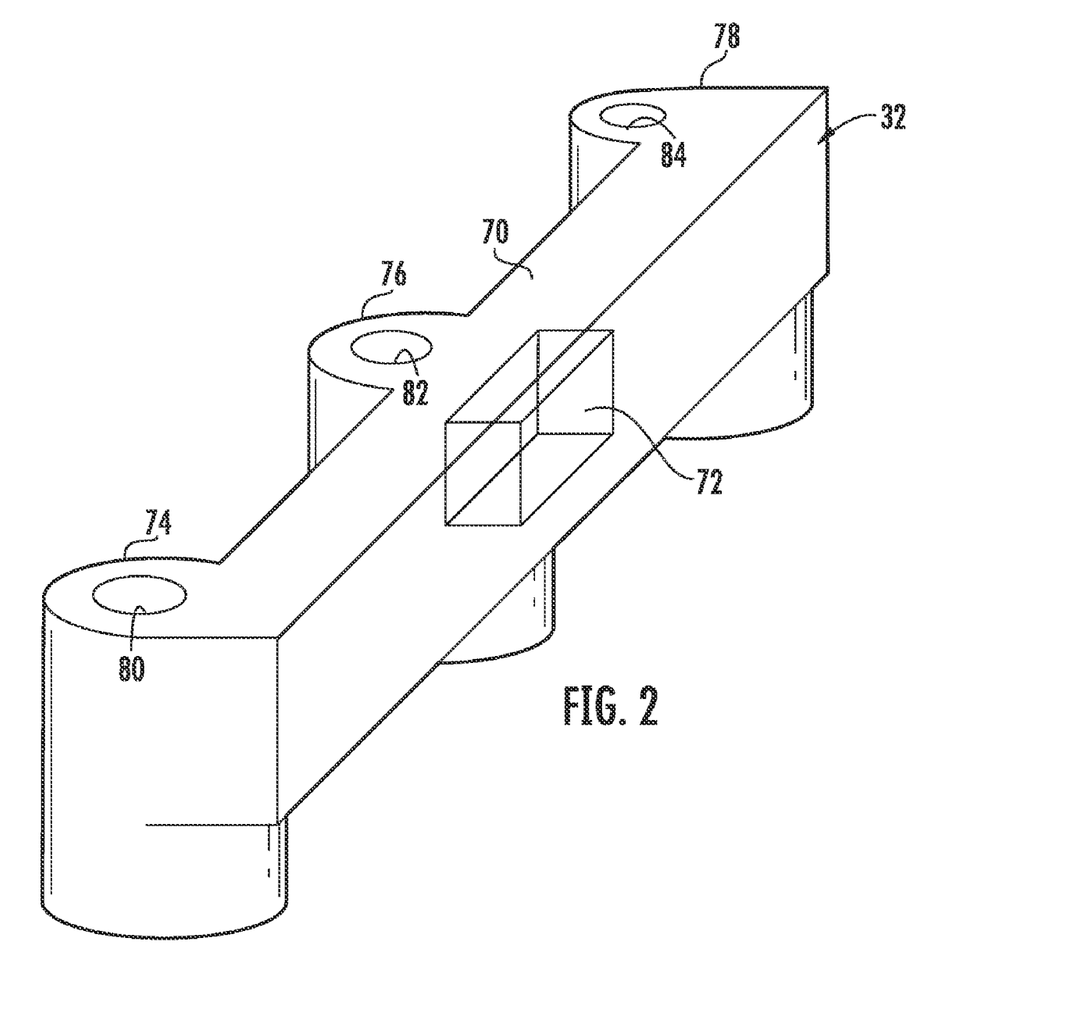
FIG. 2 is a schematic of a housing utilized in the stress-wave sensor module of FIG. 1.

Referring to FIGS. 1 and 2, the stress-wave sensor module 20 is provided to be disposed inside of the vehicle 10 and to detect stress waves propagating through the stress-wave sensor module 20 indicative of a vehicle collision event. The stress-wave sensor module 20 includes a stress-wave sensor 30 and a housing 32. The stress-wave sensor module 20 is disposed within a cavity 72 in the housing 32.

Figure 3:
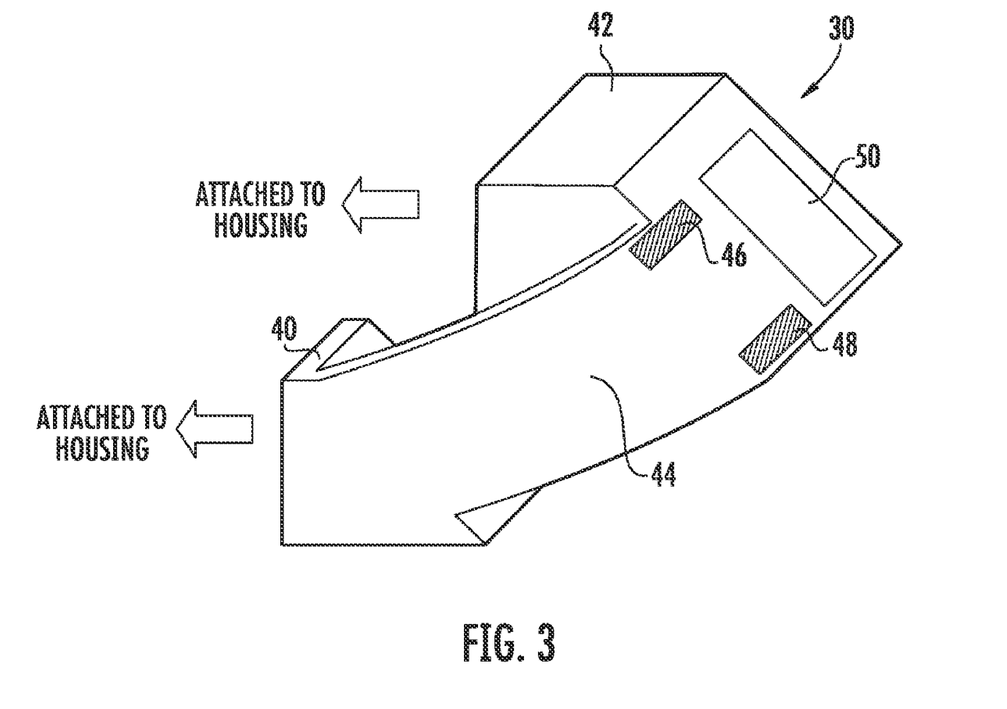
FIG. 3 is a schematic of a stress-wave sensor utilized in the stress-wave sensor module of FIG. 1 in accordance with another exemplary embodiment.

Referring to FIGS. 1 and 3, the stress-wave sensor 30 includes support members 40, 42, a diaphragm member 44, strain gauge sensors 46, 48, and a microprocessor 50.

The diaphragm member 44 is coupled between the support members 40, 42. In one exemplary embodiment, the diaphragm member 44 and the support members 40, 42 are constructed from an identical material. For example, the diaphragm member 44 and the support members 40, 42 can be constructed from a metal alloy, ceramic, or plastic. Of course, in an alternative embodiment the diaphragm member 44 could be constructed from a different material than the support members 40, 42. In one exemplary embodiment, the diaphragm member 44 is an arcuate-shaped plate member. Further, the diaphragm member 44 has a thickness less than the thickness of the support members 40, 42 such that the diaphragm member can bend or deflect when receiving a stress wave. In one exemplary embodiment, the support member 40 is a trapezoidal-shaped block. Further, the support member 42 is a trapezoidal-shaped block having a mass greater than a mass of the support member 40.

The strain gauge sensors 46, 48 are physically coupled to both the support member 42 and an end portion of the diaphragm member 44 that is coupled to the support member 42. The strain gauge sensors 46, 48 generate first and second signals, respectively in response to the strain gauge sensors 46, 48 detecting deflection of the diaphragm member 44 due to stress waves propagating through the diaphragm member 44. The strain gauge sensors 46, 48 are electrically coupled to the microprocessor 50 that receives the first and second signals from the strain gauge sensors 46, 48, respectively.

The microprocessor 50 is provided to determine whether a vehicle collision event has occurred based on the first and second signals from the strain gauge sensors 46, 48, respectively, which is discussed in greater detail below. In one exemplary embodiment, the microprocessor 50 is attached to the support member 42. Of course, in alternative embodiments the microprocessor 50 could be disposed in other locations.

Referring to FIG. 2, the housing 32 is provided to enclose the stress-wave sensor module 20 and to be coupled to a portion of the vehicle 10. The housing 32 includes a body portion 70 and post portions 74, 76, 78. In one exemplary embodiment, the body portion 70 is a rectangular bar. Further, the post portions 74, 76, 78 are coupled to a first side of the body portion 70 in a vertical orientation. The post portions 74, 76, 78 include apertures 80, 82, 84, respectively, extending therethrough. The housing 32 is coupled to a portion of the vehicle 10 utilizing threaded bolts that extend through the apertures 80, 82, 84 into corresponding threaded apertures in a portion of the vehicle 10. In one exemplary embodiment, the body portion 70 and the post portions 74, 76, 78 are constructed from an identical material. For example, the body portion 70 and the post portions 74, 76, 78 can be constructed from a metal alloy, ceramic, or plastic.

Figure 4:
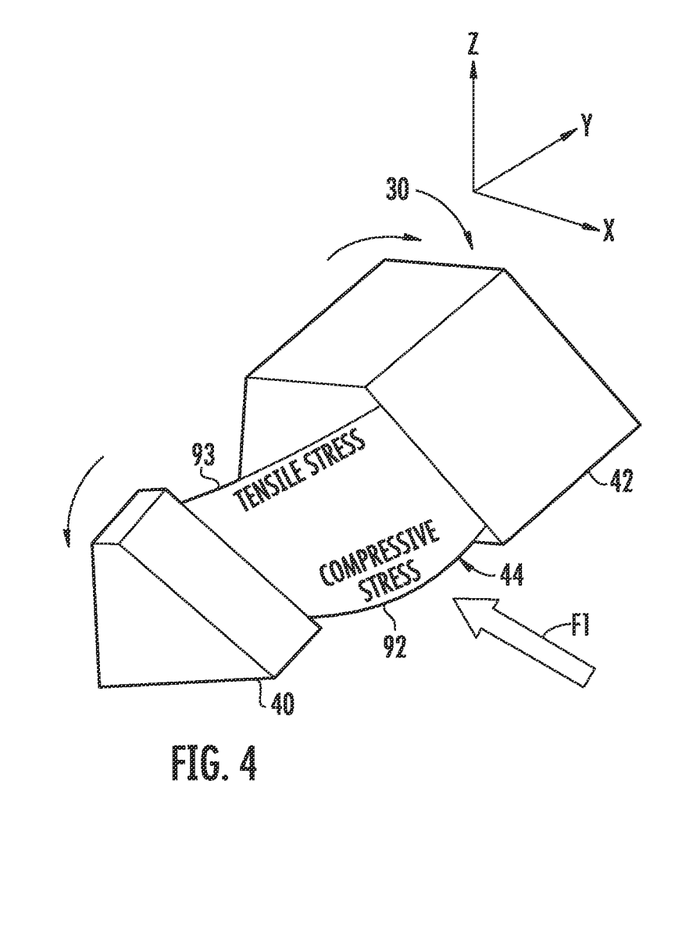
FIG. 4 is a schematic of the stress-wave sensor of FIG. 3 having a first force applied in a first direction along a first axis to the stress-wave sensor.

Referring to FIG. 4, a force that is applied to the stress-wave sensor 30 along a first axis and in a first direction is illustrated. In particular, the force F1 is applied along an X-axis in a first direction. In response to the force F1, a lower portion 92 of the diaphragm member 44 has a compressive stress therein. Further, an upper portion 93 of the diaphragm member 44 has a tensile stress therein. The strain gauge sensors 46, 48 generate signals in response to deflection of the diaphragm member 44 due to the compressive stress in the lower portion 92 and the tensile stress in the upper portion 93.

Figure 5:
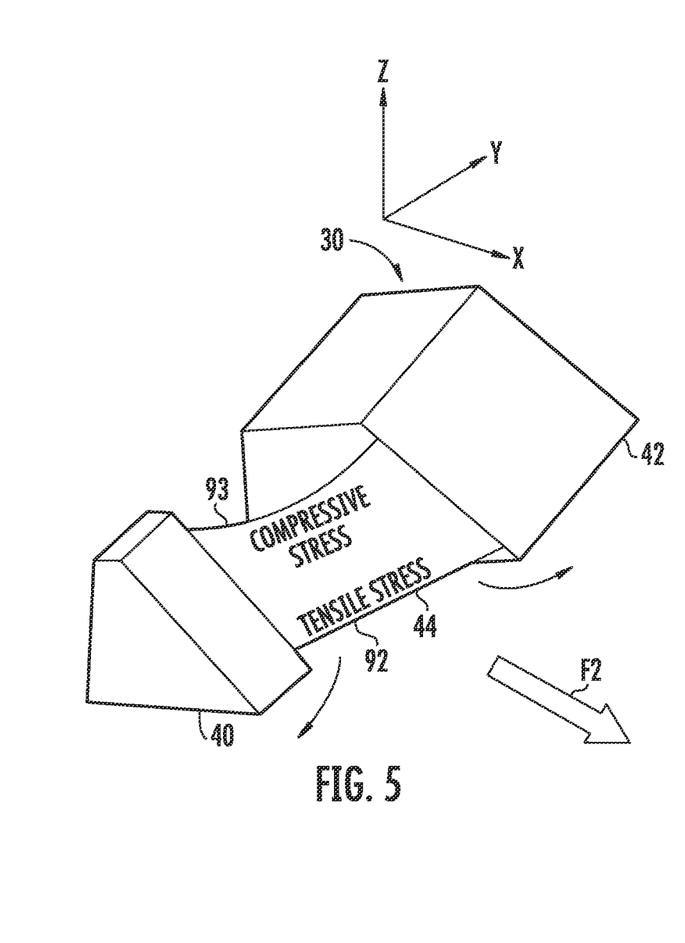
FIG. 5 is a schematic of the stress-wave sensor of FIG. 3 having a second force applied in a second direction along the first axis to the stress-wave sensor.

Referring to FIG. 5, a force that is applied to the stress-wave sensor 30 along the first axis and in a second direction is illustrated. In particular, the force F2 is applied along the X-axis in a second direction. In response to the force F2, the lower portion 92 of the diaphragm member 44 has a tensile stress therein. Further, the upper portion 93 of the diaphragm member 44 has a compressive stress therein. The strain gauge sensors 46, 48 generate signals in response to deflection of the diaphragm member 44 due to the tensile stress in the lower portion 92 and the compressive stress in the upper portion 93.

Figure 6:
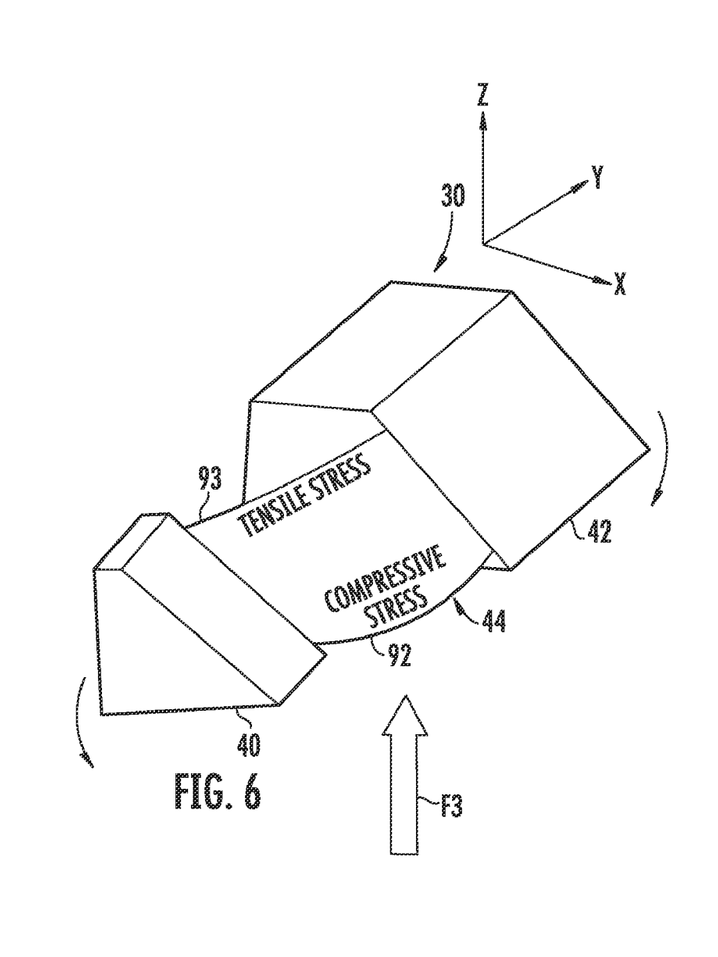
FIG. 6 is a schematic of the stress-wave sensor of FIG. 3 having a third force applied in a first direction along a second axis to the stress-wave sensor.

Referring to FIG. 6, a force that is applied to the stress-wave sensor 30 along a second axis and in a first direction is illustrated. In particular, the force F3 is applied along the Z-axis in a first direction. In response to the force F3, the lower portion 92 of the diaphragm member 44 has a compressive stress therein. Further, the upper portion 93 of the diaphragm member 44 has a tensile stress therein. The strain gauge sensors 46, 48 generate signals in response to deflection of the diaphragm member 44 due to the compressive stress in the lower portion 92 and the tensile stress in the upper portion 93.

Figure 7:
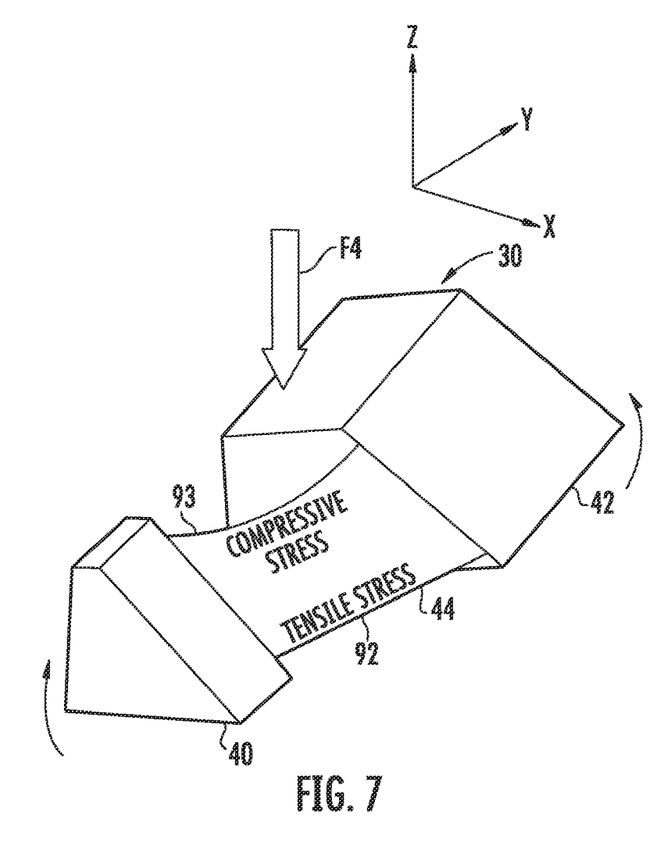
FIG. 7 is a schematic of the stress-wave sensor of FIG. 3 having a fourth force applied in a second direction along the second axis to the stress-wave sensor.

Referring to FIG. 7, a force that is applied to the stress-wave sensor 30 along the second axis and in a second direction is illustrated. In particular, the force F4 is applied along the Z-axis in a second direction. In response to the force F4, the lower portion 92 of the diaphragm member 44 has a tensile stress therein. Further, the upper portion 93 of the diaphragm member 44 has a compressive stress therein. The strain gauge sensors 46, 48 generate signals in response to deflection of the diaphragm member 44 due to the tensile stress in the lower portion 92 and the compressive stress in the upper portion 93.

Figure 8:
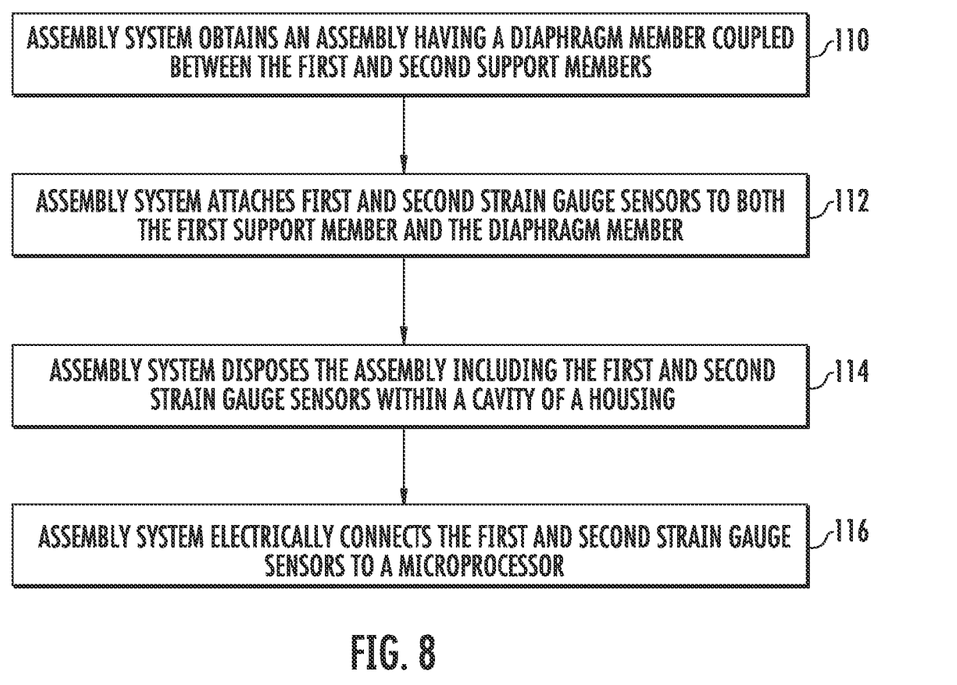
FIG. 8 is a flowchart of a method for assembling a stress-wave sensor module in accordance with another exemplary embodiment.
Figure 9:
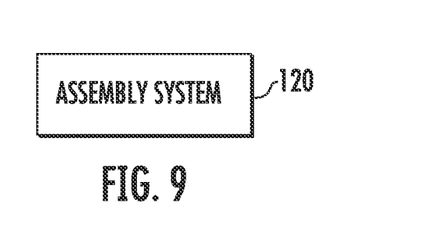
FIG. 9 is a block diagram of an assembly system utilized to assemble the stress-wave sensor module.

Referring to FIGS. 8 and 9, a flowchart of a method for assembling the stress-wave sensor module 21 in accordance with another exemplary embodiment will now be explained.

At step 110, the assembly system 120 obtains an assembly having the diaphragm member 44 coupled between the support members 40, 42.

At step 112, the assembly system 120 attaches strain gauge sensors 46, 48 to both the support member 42 and the diaphragm member 44.

At step 114, the assembly system 120 disposes the assembly including the strain gauge sensors 46, 48 within the cavity 72 of the housing 32.

At step 116, the assembly system 120 electrically connects the strain gauge sensors 46, 48 to the microprocessor 50.

Figure 10:
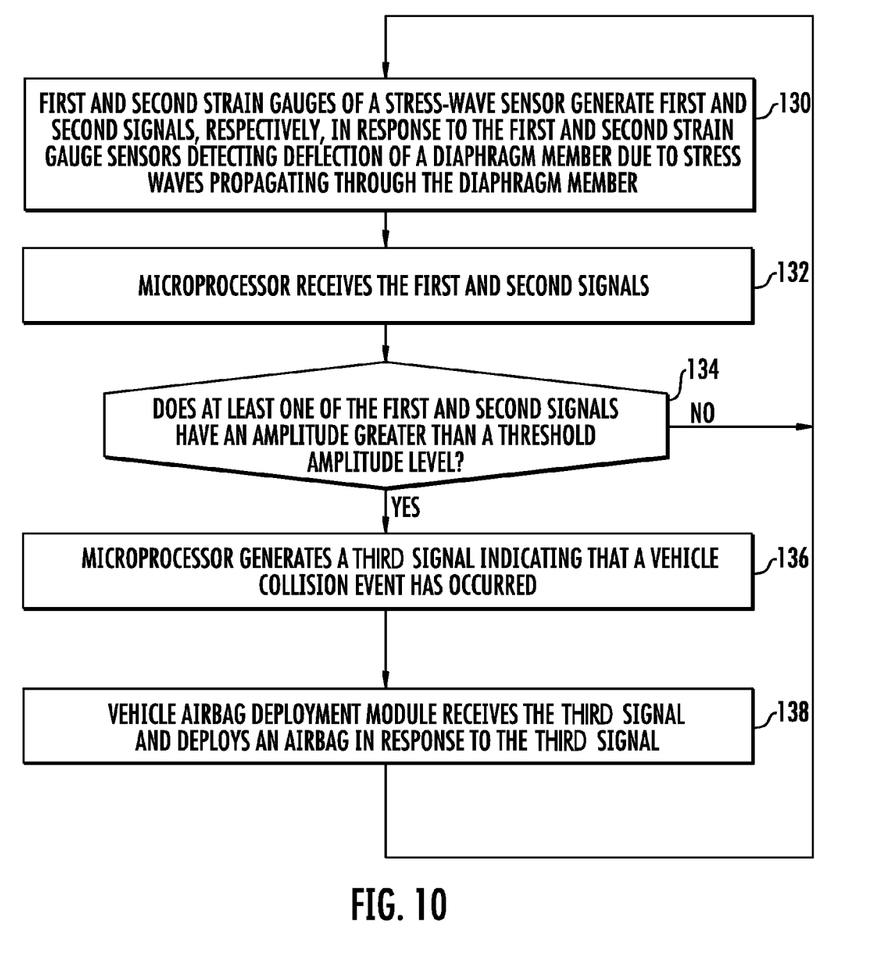
FIG. 10 is a flowchart of a method for detecting a vehicle collision event utilizing a stress-wave sensor module in accordance with another exemplary embodiment.

Referring to FIG. 10, a flowchart of a method for detecting a vehicle collision event utilizing the stress-wave sensor 30 in accordance with another exemplary embodiment will now be explained.

At step 130, the strain gauge sensors 46, 48 of the stress-wave sensor 30 generate first and second signals, respectively, in response to the strain gauge sensors 46, 48 detecting deflection of the diaphragm member 44 due to stress waves propagating through the diaphragm member 44. After step 130, the method advances to step 132.

At step 132, the microprocessor 50 receives the first and second signals. After step 132, the method advances to step 134.

At step 134, the microprocessor 50 makes a determination as to whether one of the first and second signals has an amplitude greater than a threshold amplitude level indicating a vehicle collision event has occurred. If the value of step 134 equals "yes", the method advances to step 136. Otherwise, the method returns to step 130.

At step 136, the microprocessor 50 generates a third signal indicating that a vehicle collision event has occurred. After step 136, the method advances to step 138. It should be noted that in one exemplary embodiment, the stress-wave sensor module 20 has a response time of 3-4 milliseconds. In particular, in the exemplary embodiment, the microprocessor 50 can generate the third signal within 3-4 milliseconds after a stress-wave indicating a vehicle collision event is received by the stress-wave sensor 30.

At step 138, the vehicle airbag deployment module 22 receives the third signal and deploys an air bag in the vehicle 10 in response to the third signal. After step 138, the method returns to step 130.

Figure 11:
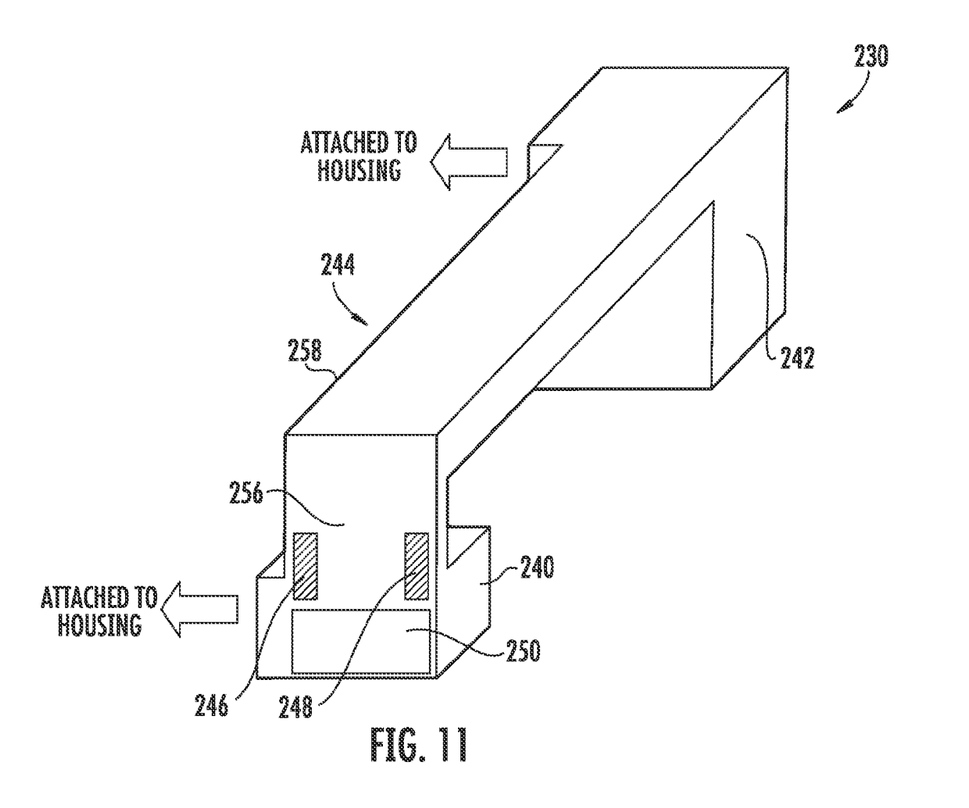
FIG. 11 is a schematic of another stress-wave sensor in accordance with another exemplary embodiment.

Referring to FIG. 11, a stress-wave sensor 230 in accordance with another exemplary embodiment is provided. The stress-wave sensor 230 can be utilized in the stress-wave sensor module 20, instead of the stress-wave sensor 30. The stress-wave sensor 230 includes support members 240, 242, a diaphragm member 244, strain gauge sensors 246, 248, and a microprocessor 250.

The diaphragm member 244 is coupled between the support members 240, 242. In one exemplary embodiment, the diaphragm member 244 and the support members 240, 242 are constructed from an identical material. For example, the diaphragm member 244 and the support members 240, 242 can be constructed from a metal alloy, ceramic, or plastic. Of course, in an alternative embodiment the diaphragm member 244 could be constructed from a different material than the support members 240, 242. In one exemplary embodiment, the diaphragm member 244 has plate members 256, 258. The first end of the plate member 256 is coupled to the support member 240. A first end of the plate member 258 is coupled to a second end of the plate member 256. The plate member 258 is disposed generally perpendicular to the plate member 256 and a second end of the plate member 258 is coupled to the support member 242. Further, the diaphragm member 244 has a thickness less than the thickness of the support members 240, 242 such that the diaphragm member 244 can bend or deflect when receiving a stress wave. In one exemplary embodiment, the support member 40 is a rectangular-shaped block. Further, the support member 242 is a rectangular-shaped block having a mass greater than a mass of the support member 240.

The strain gauge sensors 246, 248 are physically coupled to both the support member 240 and an end portion of the diaphragm member 244 that is coupled to the support member 240. The strain gauge sensors 246, 248 generate first and second signals, respectively in response to the strain gauge sensors 246, 248 detecting deflection of the diaphragm member 244 due to stress waves propagating through the diaphragm member 244. The strain gauge sensors 246, 248 are electrically coupled to the microprocessor 250 that receives the first and second signals from the strain gauge sensors 246, 248, respectively.

The microprocessor 250 is provided to determine whether a vehicle collision event has occurred based on the first and second signals from the strain gauge sensors 246, 248, respectively. The microprocessor 250 operates in a similar manner as the microprocessor 50. In one exemplary embodiment, the microprocessor 250 is attached to the support member 240. Of course, in alternative embodiments the microprocessor 250 could be disposed in other locations.

Figure 12:
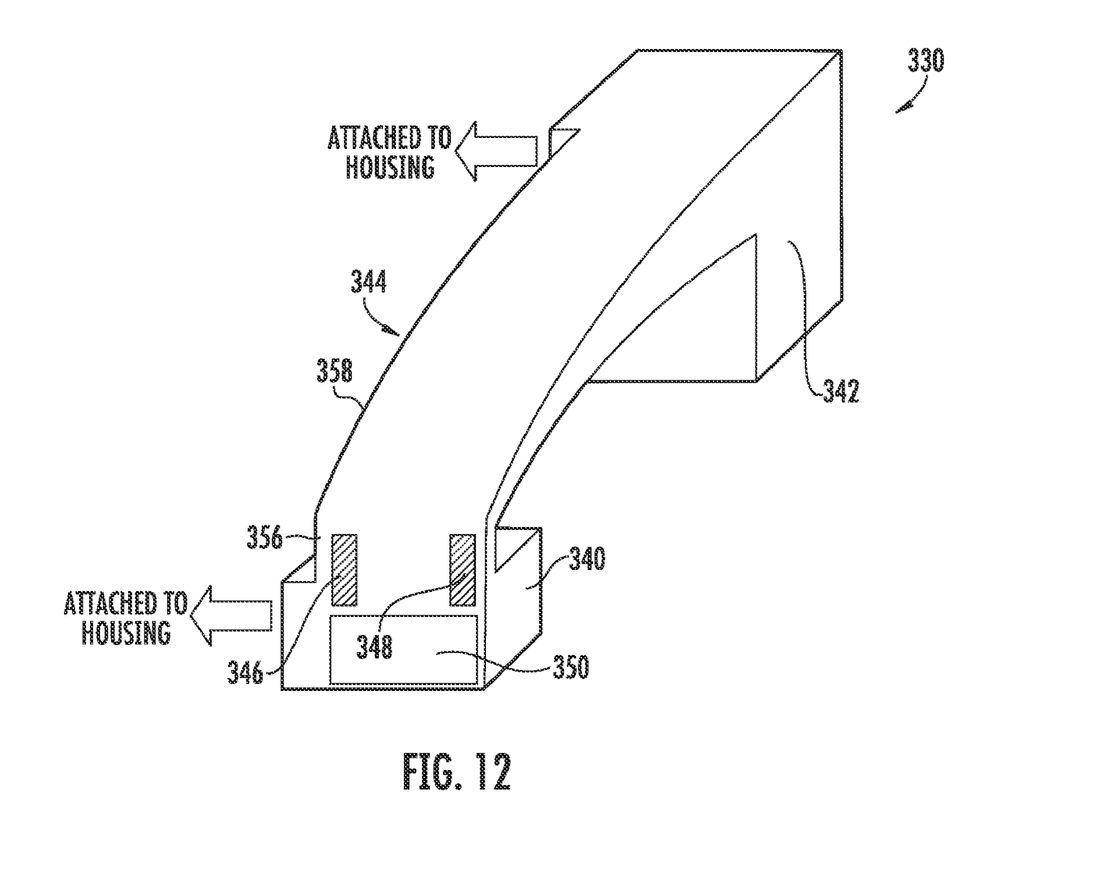
FIG. 12 is a schematic of another stress-wave sensor in accordance with another exemplary embodiment.

Referring to FIG. 12, a stress-wave sensor 330 in accordance with another exemplary embodiment is provided. The stress-wave sensor 330 can be utilized in the stress-wave sensor module 20, instead of the stress-wave sensors 30, 230. The stress-wave sensor 330 includes support members 340, 342, a diaphragm member 344, strain gauge sensors 346, 348, and a microprocessor 350.

The diaphragm member 344 is coupled between the support members 340, 342. In one exemplary embodiment, the diaphragm member 344 and the support members 340, 342 are constructed from an identical material. For example, the diaphragm member 344 and the support members 340, 342 can be constructed from a metal alloy, ceramic, or plastic. Of course, in an alternative embodiment the diaphragm member 344 could be constructed from a different material than the support members 340, 342. In one exemplary embodiment, the diaphragm member 344 has plate members 356, 358. The plate member 358 is arcuate-shaped. A first end of the plate member 356 is coupled to the support member 340. A first end of the plate member 358 is coupled to a second end of the plate member 356. Further, a second end of the plate member 358 is coupled to the support member 342. The diaphragm member 344 has a thickness less than a thickness of the support members 340, 342 such that the diaphragm member 344 can bend or deflect when receiving a stress wave. In one exemplary embodiment, the support member 340 is a rectangular-shaped block. Further, the support member 342 is a rectangular-shaped block having a mass greater than a mass of the support member 340.

The strain gauge sensors 346, 348 are physically coupled to both the support member 340 and an end portion of the diaphragm member 344 that is coupled to the support member 340. The strain gauge sensors 346, 348 generate first and second signals, respectively in response to the strain gauge sensors 346, 348 detecting deflection of the diaphragm member 344 due to stress waves propagating through the diaphragm member 344. The strain gauge sensors 346, 348 are electrically coupled to the microprocessor 350 that receives the first and second signals from the strain gauge sensors 346, 348, respectively.

The microprocessor 350 is provided to determine whether a vehicle collision event has occurred based on the first and second signals from the strain gauge sensors 346, 348, respectively. The microprocessor 350 operates in a similar manner as the microprocessor 50. In one exemplary embodiment, the microprocessor 350 is attached to the support member 340. Of course, in alternative embodiments the microprocessor 350 could be disposed in other locations.

Figure 13:
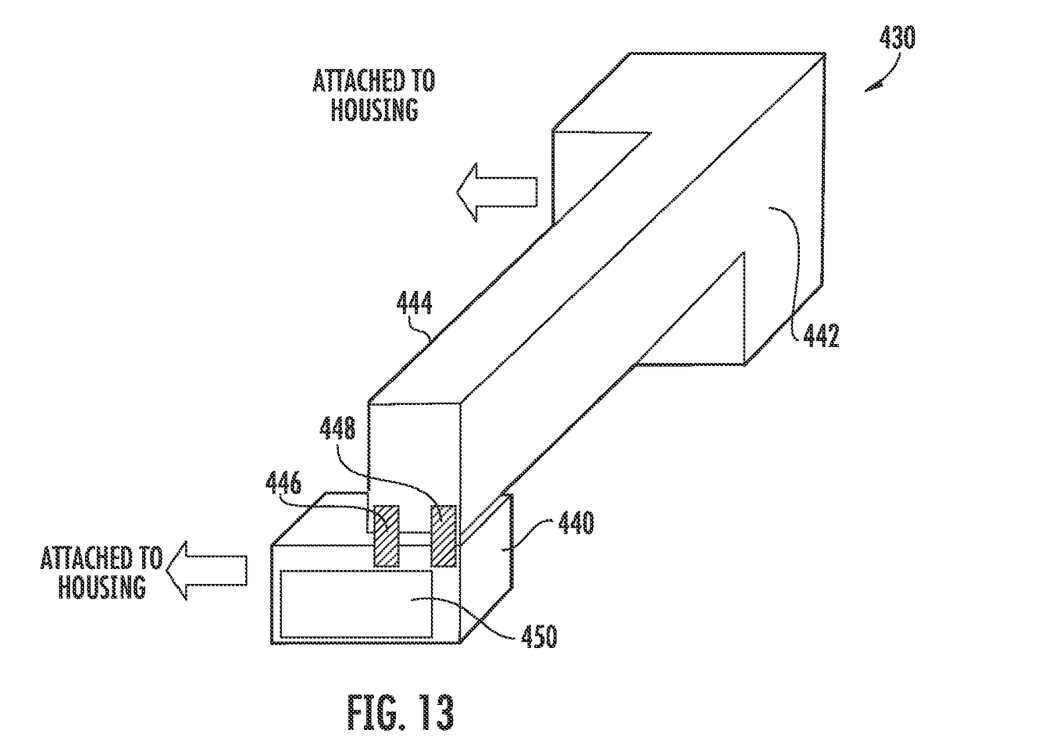
FIG. 13 is a schematic of another stress-wave sensor in accordance with another exemplary embodiment.

Referring to FIG. 13, a stress-wave sensor 430 in accordance with another exemplary embodiment is provided. The stress-wave sensor 430 can be utilized in the stress-wave sensor module 20, instead of the stress-wave sensors 30, 230 and 330. The stress-wave sensor 430 includes support members 440, 442, a diaphragm member 444, strain gauge sensors 446, 448, and a microprocessor 450.

The diaphragm member 444 is coupled between the support members 440, 442. In one exemplary embodiment, the diaphragm member 444 and the support members 440, 442 are constructed from an identical material. For example, the diaphragm member 444 and the support members 440, 442 can be constructed from a metal alloy, ceramic, or plastic. Of course, in an alternative embodiment the diaphragm member 444 could be constructed from a different material than the support members 440, 442. In one exemplary embodiment, the diaphragm member 444 is a plate member. The diaphragm member 444 is coupled between the support members 440, 442. Further, the diaphragm member 444 has a thickness less than the thickness of the support member 442 such that the diaphragm member 444 can bend or deflect when receiving a stress wave. In one exemplary embodiment, the support member 440 is a rectangular-shaped block. Further, the support member 442 is a rectangular-shaped block having a mass greater than a mass of the support member 440.

The strain gauge sensors 446, 448 are physically coupled to both the support member 440 and an end portion of the diaphragm member 444 that is coupled to the support member 440. The strain gauge sensors 446, 448 generate first and second signals, respectively in response to the strain gauge sensors 446, 448 detecting deflection of the diaphragm member 444 due to stress waves propagating through the diaphragm member 444. The strain gauge sensors 446, 448 are electrically coupled to the microprocessor 450 that receives the first and second signals from the strain gauge sensors 446, 448, respectively.

The microprocessor 450 is provided to determine whether a vehicle collision event has occurred based on the first and second signals from the strain gauge sensors 446, 448, respectively. The microprocessor 450 operates in a similar manner as the microprocessor 50. In one exemplary embodiment, the microprocessor 450 is attached to the support member 440. Of course, in alternative embodiments the microprocessor 450 could be disposed in other locations.

The stress-wave sensor module, the stress-wave sensor, and the method for detecting a vehicle collision event utilizing the stress-wave sensor provide a substantial advantage over other sensors and methods. In particular, the stress-wave sensor module, the stress-wave sensor, and the associated method generate signals in response to strain gauge sensors detecting deflection of a diaphragm member due to stress waves propagating through the diaphragm member during a vehicle collision event to determine that the vehicle collision event has occurred. Further, a response time of the stress-wave sensor module and stress-wave sensor are faster than many other sensors.

While embodiments of the invention are described with reference to the exemplary embodiments, it will be understood by those skilled in the art that various changes may be made and equivalents may be substituted for elements thereof without departing from the scope of the invention. In addition, many modifications may be made to the teachings of the invention to adapt to a particular situation without departing from the scope thereof. Therefore, it is intended that the invention not be limited to the embodiment disclosed for carrying out this invention, but that the invention includes all embodiments falling within the scope of the intended claims. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

What is claimed is:

1. A stress-wave sensor, comprising:
   first and second support members;
   a diaphragm member coupled between the first and second support members; and
   first and second strain gauge sensors coupled to both the first support member and the diaphragm member, the first and second strain gauge sensors generating first and second signals, respectively, in response to the first and second strain gauge sensors detecting deflection of the diaphragm member due to stress waves propagating through the diaphragm member, wherein the diaphragm member has first and second plate members, a first end of the first plate member coupled to the first support member, a first end of the second plate member coupled to a second end of the first plate member, the second plate member being disposed generally perpendicular to the first plate member, and a second end of the second plate member coupled to the second support member.

2. The stress-wave sensor of claim 1, further comprising a microprocessor receiving the first and second signals from the first and second strain gauge sensors, respectively, the microprocessor configured to generate a third signal when at least one of the first and second signals is greater than a threshold amplitude level indicating a vehicle collision event has occurred.

3. The stress-wave sensor of claim 1, wherein the first and second support members and the diaphragm member are constructed of an identical material.

4. The stress-wave sensor of claim 3, wherein the identical material is a metal alloy.

5. A stress-wave sensor, comprising:
   first and second support members;
   a diaphragm member coupled between the first and second support members; and
   first and second strain gauge sensors coupled to both the first support member and the diaphragm member, the first and second strain gauge sensors generating first and second signals, respectively, in response to the first and second strain gauge sensors detecting deflection of the diaphragm member due to stress waves propagating through the diaphragm member, wherein the diaphragm member has first and second plate members, the second plate member being arcuate-shaped, a first end of the first plate member coupled to the first support member, a first end of the second plate member coupled to a second end of the first plate member, and a second end of the second plate member coupled to the second support member.

6. The stress-wave sensor of claim 5, further comprising a microprocessor receiving the first and second signals from the first and second strain gauge sensors, respectively, the microprocessor configured to generate a third signal when at least one of the first and second signals is greater than a threshold amplitude level indicating a vehicle collision event has occurred.

7. The stress-wave sensor of claim 5, wherein the first and second support members and the diaphragm member are constructed of an identical material.

8. The stress-wave sensor of claim 7, wherein the identical material is a metal alloy.

9. A method for detecting a vehicle collision event utilizing a stress-wave sensor, the stress-wave sensor having first and second support members, a diaphragm member, and first and second strain gauge sensors, the diaphragm member coupled between the first and second support members, the first and second strain gauge sensors coupled to both the first support member and the diaphragm member, the method comprising:
   generating first and second signals utilizing the first and second strain gauge sensors, respectively, in response to the first and second strain gauge sensors detecting deflection of the diaphragm member due to stress waves propagating through the diaphragm member;
   receiving the first and second signals at a microprocessor;
   determining whether at least one of the first and second signals has an amplitude greater than a threshold amplitude level, utilizing the microprocessor; and
   generating a third signal indicating the vehicle collision event has occurred if at least one of the first and second signals has an amplitude greater than the threshold amplitude level, utilizing the microprocessor.

* * * * *